US005737816A

United States Patent [19]

Hartmann et al.

[11] Patent Number: 5,737,816

[45] Date of Patent: Apr. 14, 1998

[54] DEVICE FOR THE MOUNTING OF ROTATING BLADES

[75] Inventors: Peter Hartmann, Untersiggenthal, Switzerland; Michael Hock, Bad Säckingen, Germany; Alfred Krähenbühl, Gipf-Oberfrick; Beat von Arx, Trimbach, both of Switzerland

[73] Assignee: Asea Brown Boveri AG, Baden, Switzerland

[21] Appl. No.: 623,824

[22] Filed: Mar. 29, 1996

[30] Foreign Application Priority Data

Jun. 2, 1995 [DE] Germany ........................ 195 20 274.0

[51] Int. Cl.[6] ........................ B23B 27/14

[52] U.S. Cl. ........................ 29/23.51; 29/889.21; 29/464; 29/281.1

[58] Field of Search ........................ 29/23.51, 889.1, 29/889.2, 889.21, 889.22, 464, 281.1

[56] References Cited

U.S. PATENT DOCUMENTS

| | | | |
|---|---|---|---|
| 2,240,743 | 5/1941 | Allen | 29/23.51 |
| 4,171,799 | 10/1979 | Elko | 269/42 |
| 4,684,325 | 8/1987 | Arnold | 29/889.21 X |
| 4,702,673 | 10/1987 | Hansen et al. | 29/889.21 X |
| 4,944,082 | 7/1990 | Jones et al. | 29/464 |
| 5,001,830 | 3/1991 | Partington et al. | 29/889.21 |
| 5,257,442 | 11/1993 | Tanaka et al. | 29/23.51 |

FOREIGN PATENT DOCUMENTS

| | | | |
|---|---|---|---|
| 522707 | 3/1956 | Canada | 29/23.51 |
| 536847 | 5/1922 | France | 29/23.51 |
| 1 426 778 | 11/1969 | Germany. | |

*Primary Examiner*—S. Thomas Hughes

*Attorney, Agent, or Firm*—Burns, Doane, Swecker & Mathis, L.L.P.

[57] ABSTRACT

A device for the mounting of moving blades having essentially axial roots into corresponding axial grooves of a rotor of a turbomachine includes a radially outer head having at least one axial groove corresponding essentially to an axial root of one of the rotating blades and a radially inner foot part for mounting in a groove encircling the rotor.

4 Claims, 3 Drawing Sheets

DEVICE FOR THE MOUNTING OF ROTATING BLADES

BACKGROUND OF THE INVENTION

1. Field of the Invention

The invention relates to a device and a method for the mounting of rotating blades having essentially axial roots into the corresponding axial grooves of a rotor of a turbomachine.

2. Discussion of Background

Devices and methods of this kind for the mounting of rotating blades having essentially axial roots into the corresponding axial grooves of a rotor of a turbomachine are known. They are required for the mounting of rotating blades of a blade row, the rotating blades of which are formed, for example, with specially shaped cover bands or platforms or with blade roots having overlaps. So that the last blade of a blade row can be mounted axially, a special blade is required. These special blades are very expensive to produce, and mounting necessitates a special outlay or is not always possible for technical reasons. Furthermore, the use of special blades is highly complicated logistically.

SUMMARY OF THE INVENTION

The object on which the invention is based, in a device for the mounting of rotating blades and in the associated method of the initially mentioned type, is to simplify the mounting of rotating blades having axial roots.

This is achieved, according to the invention, in that the mounting device consists of a radially outer head part having at least one axial groove corresponding essentially to the axial root of the rotating blade and of a radially inner foot part for mounting in a groove encircling the rotor.

The advantages of the invention are to be seen, inter alia, in that rotating blades provided with axial roots can be inserted radially. As a result, the rotating blades can be designed without consideration of axial displaceability. This means that, for example, cover bands, platforms or blade roots can have any forms.

Because each blade row is mounted individually, the blade rows can be designed with different numbers of blades per row and with different axial roots.

It is particularly advantageous if peripheral grooves are already present in the rotor between the axial grooves, for example for receiving heat buildup segments in the case of gas turbine rotors. These peripheral grooves can then be used for mounting the rotating blades.

BRIEF DESCRIPTION OF THE DRAWINGS

A more complete appreciation of the invention and many of the attendant advantages thereof will be readily obtained as the same becomes better understood by reference to the followed detailed description when considered in connection with the accompanying drawings, wherein an exemplary embodiment of the invention is represented by reference to part of a gas turbine rotor. In the drawings.

Only the elements essential for understanding the invention are shown. The arrows designate the direction of the blades.

DESCRIPTION OF THE PREFERRED EMBODIMENTS

Figure 1:
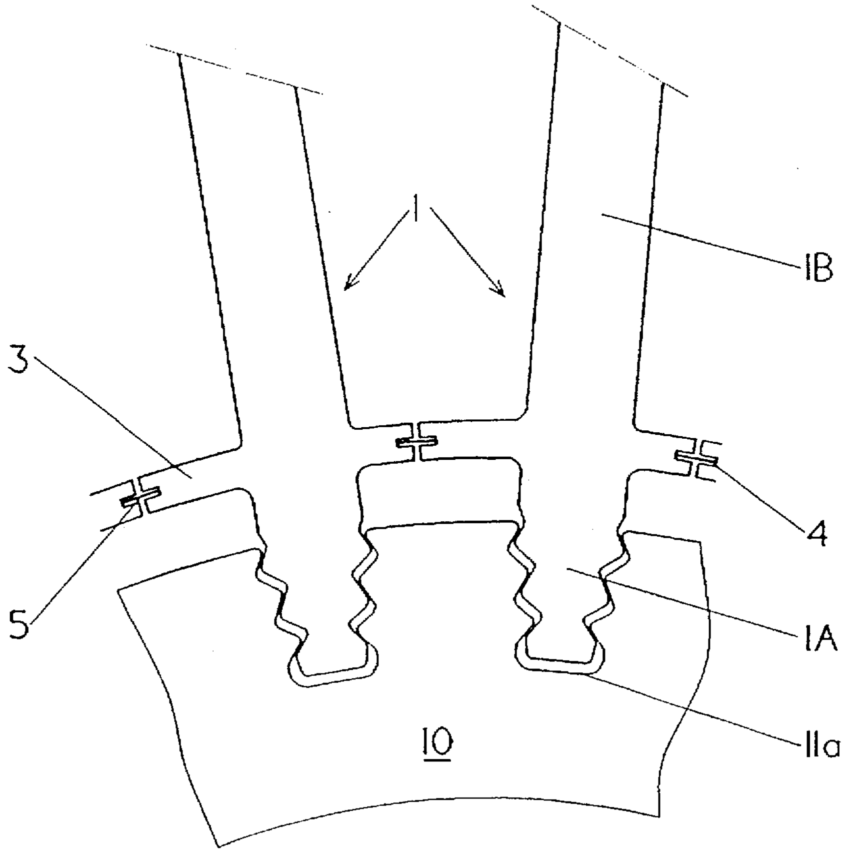
FIG. 1 shows a part cross section through a gas turbine rotor.

Referring now to the drawings, wherein like reference numerals designate identical or corresponding parts throughout the several views, in FIG. 1 rotating blades 1, consisting of a blade root 1A and blade leaf 1B, are inserted into axial grooves 11*a* of a rotor 10. In order to protect the rotor 10 from hot gases, a platform 3 is arranged between the blade root 1A and the blade leaf 1B. Sealing off takes place on the contact surfaces of these platforms via sealing strips 5 which are inserted into sealing grooves 4.

Figure 2:
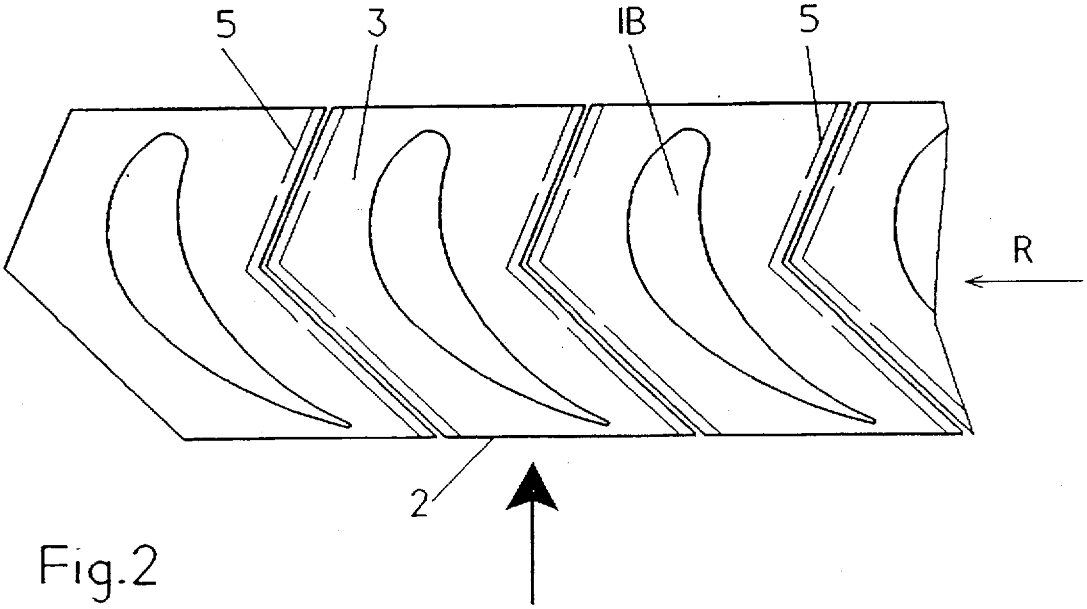
FIG. 2 shows the partial development of a rotating blade row of the gas turbine rotor in the part cross section from FIG. 1.

After the shaping of the platforms 3 which is shown in FIG. 2, it is impossible to introduce all the blades 1 of a blade row R axially into the axial grooves 11*a*. A rotating blade 2 introduced last would therefore have to be made, for example, from two parts.

Figure 3:
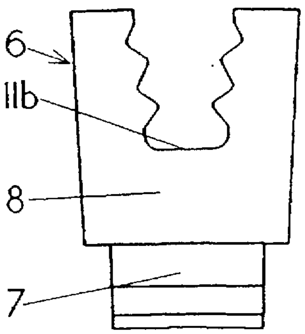
FIG. 3 shows a mounting device in cross section.

FIG. 3 shows a one-piece mounting device 6 consisting of a foot part 7 and a head part 8. An axial groove 11*b* shaped according to the axial groove 11*a* is arranged in the head part 8. A blade root 1A of a rotating blade 1 is then inserted into the axial groove 11*b*.

Figure 4:
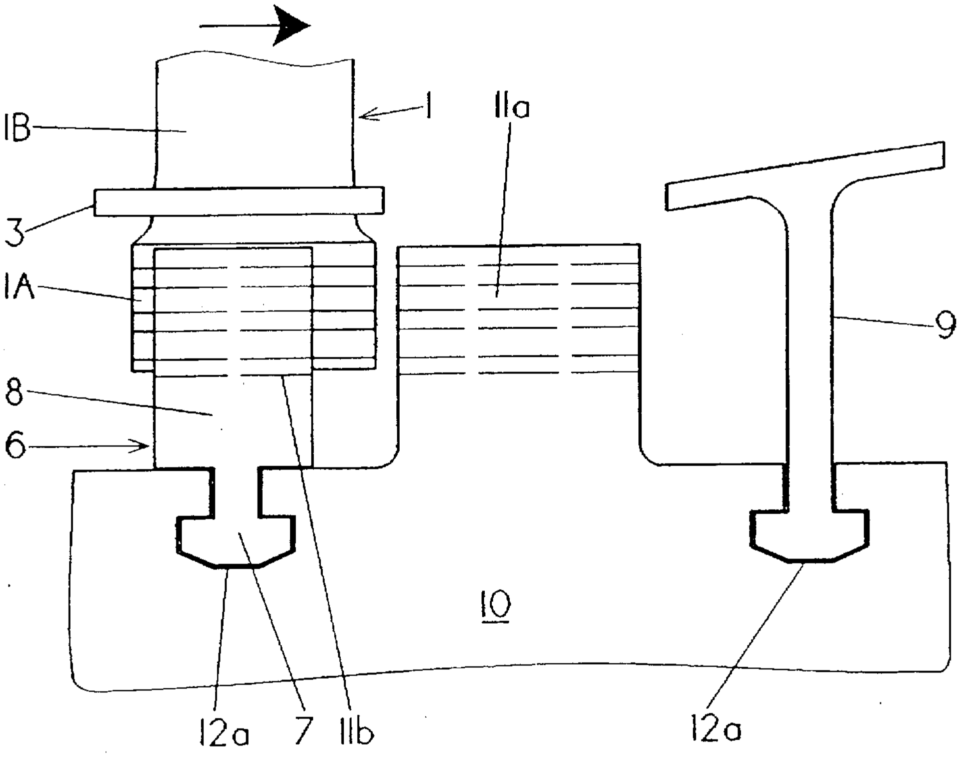
FIG. 4 shows a part longitudinal section through the gas turbine rotor.

According to FIG. 4, the mounting device 6, together with the blade 1, is inserted radially into a peripheral groove 12*a* of the rotor 10, for which purpose the foot part 7 of the mounting device is shaped according to the peripheral groove 12*a*. To this effect, a filling orifice (not shown) is provided in that peripheral groove 12*a* or the foot part 7 is rotated into the peripheral groove 12*a* by means of a ninety degree turn. The peripheral groove 12*a* otherwise serves for receiving heat buildup segments 9 and therefore does not have to be made specially. The heat buildup segments 9 protect the rotor 10 between the rotating blade rows R. All the rotating blades 1 of a blade row R are then introduced radially into the peripheral groove 12*a* in succession together with the mounting device 6. The sealing strips 5 are inserted in each case into the sealing grooves 4 of the platforms 3, before the blades 1 are pushed together along the peripheral groove 12*a* by means of the mounting device 6. Because the sealing strips 5 do not have to be pushed axially into the sealing grooves 4 after the mounting of the blades 1 on the rotor 10, they can be shaped essentially as desired. By pushing the mounting devices 6 in the circumferential direction and by utilizing tangential plays, the sealing strips 5 can be inserted into the sealing groove, even in the case of the rotating blade 2 radially inserted last. The mounting devices are thereafter displaced in the circumferential direction in such a way that, in each case, the axial grooves 11*b* of the mounting devices come to rest exactly in front of the axial grooves 11*a* in the rotor. Then, by utilizing the axial displaceability as a result of the plays between the platforms 3, the entire rotating blade row R is pushed piece by piece into the axial grooves 11*a* of the rotor. When all the rotating blades 1 are inserted with their blade roots 1A in the axial grooves 11*a* of the rotor, the mounting devices 6 can be extracted via the filling orifice (not shown) of the peripheral groove 12*a* of the rotor. The heat buildup segments 9 can then be inserted into the peripheral groove 12*a*.

Figure 5:
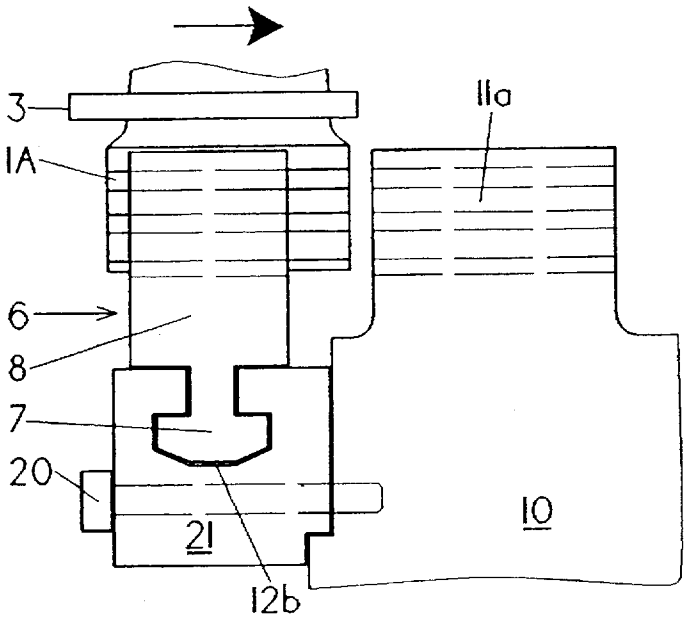
FIG. 5 shows a part longitudinal section through the gas turbine rotor with an accessory for the mounting device.

If there is no peripheral groove 12*a* in the rotor 10, according to FIG. 5 an annular accessory 21 can be mounted on the rotor. This takes place by means of a releasable connection, preferably by means of screws 20. The accessory 21, consisting of a ring or of a plurality of ring parts, contains a peripheral groove 12*b* which can be designed according to the peripheral groove 12*a* in the rotor. The mounting of the rotating blades 1 by means of the mounting device 6 then takes place in exactly the same way as described above for the peripheral groove 12*a*.

Figure 6:
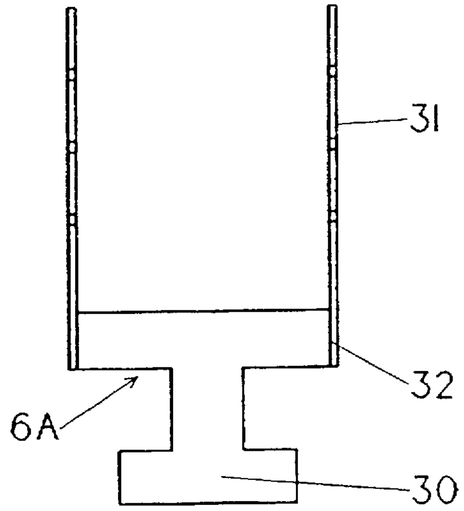
FIG. 6 shows a further alternative version of the mounting device in longitudinal section.
Figure 7:
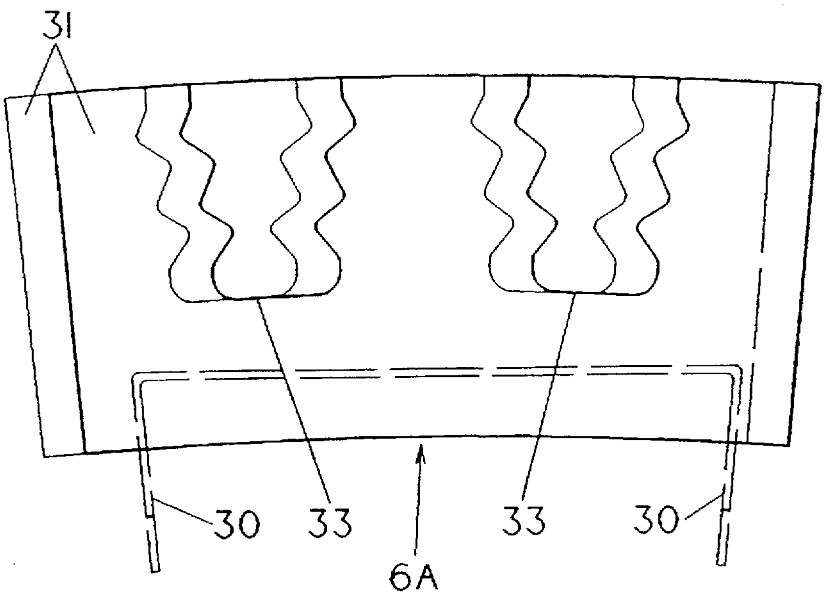
FIG. 7 shows the mounting device of FIG. 6 in cross section.

FIG. 6 and FIG. 7 show an economically particularly advantageous version of a mounting device 6A, consisting of a head part 31 and of a foot part 30. It consists of a flat material, for example of sheet metal. The parts 30 and 31 can be cut out from the flat material, for example by punching out or laser cutting. The foot part 30 then has only to be reshaped. The two parts of the head part 31 are connected to the foot part 30 via a seam 32. The mounting device 6A serves here for the simultaneous and rapid mounting of two rotating blades 1 having oblique axial roots. For this purpose, two oblique axial grooves 33 are arranged in the mounting device 6A, in order to receive two rotating blade roots.

Of course, the invention is not restricted to the exemplary embodiment shown and described. The mounting device can be used whenever there are any axial grooves. There can be essentially any number of axial grooves per mounting device. It depends, for example, on the blade size, the blade weight, the rotor diameter and the size of the filling orifice. The mounting device is of any design, for example the foot part can also be produced from a solid material and the head part, as in FIGS. 6 and 7, from a flat material, or vice versa.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States of is:

1. A device for the mounting of rotating blades of a rotor of a turbomachine having an axis, the blades having essentially axial roots for being mounted into corresponding axial grooves of the rotor, comprising:

a radially outer head part having at least one axial groove corresponding essentially to an axial root of one of the rotating blades; and a radially inner foot part removably mounted in a peripheral groove in the rotor.

2. The device for the mounting of rotating blades as claimed in claim 1, wherein two or more parts connected to one another form the head part and the foot part.

3. The device for the mounting of rotating blades as claimed in claim 2, wherein the two or more parts are sheet metal parts.

4. The device for the mounting of rotating blades as claimed in claim 3, wherein the foot part is a U-shaped sheet metal part and the head part is formed by two sheet metal parts connected to the foot part along a seam.

* * * * *